United States Patent [19]

Wexler

[11] Patent Number: 5,589,324
[45] Date of Patent: Dec. 31, 1996

[54] ANTISTATIC LAYER FOR PHOTOGRAPHIC ELEMENTS COMPRISING POLYMERIZED POLYFUNCTIONAL AZIRIDINE MONOMERS

[75] Inventor: Allan J. Wexler, Vestal, N.Y.

[73] Assignee: International Paper Company, Purchase, N.Y.

[21] Appl. No.: 91,335

[22] Filed: Jul. 13, 1993

[51] Int. Cl.$^6$ .................................................. G03C 1/89
[52] U.S. Cl. .......................... 430/529; 430/527; 430/542
[58] Field of Search ..................................... 430/527, 529, 430/542

[56] References Cited

U.S. PATENT DOCUMENTS

| | | |
|---|---|---|
| 2,403,533 | 7/1946 | Kaszuba . |
| 2,420,611 | 5/1947 | Mueller . |
| 2,527,267 | 10/1950 | Hart et al. . |
| 3,137,668 | 6/1964 | Kuppers . |
| 3,620,751 | 11/1971 | Stol et al. . |
| 3,630,742 | 12/1971 | Crawford et al. . |
| 3,791,831 | 2/1974 | von Bonin et al. . |
| 3,907,756 | 9/1975 | Marx et al. . |
| 4,001,150 | 1/1977 | Juna et al. . |
| 4,011,201 | 3/1977 | Ponticello . |
| 4,041,001 | 8/1977 | Szymanski et al. . |
| 4,118,375 | 10/1978 | Lindner et al. ........................ 526/240 |
| 4,119,464 | 10/1978 | Sauerteig et al. . |
| 4,143,020 | 3/1979 | Emmons et al. . |
| 4,147,550 | 4/1979 | Campbell et al. . |
| 4,225,665 | 9/1980 | Schadt, III ........................... 430/529 |
| 4,251,626 | 2/1981 | Minamizono et al. ................. 430/527 |
| 4,268,623 | 5/1981 | Sera et al. ........................... 430/529 |
| 4,396,708 | 8/1983 | Ogawa et al. ........................ 430/529 |
| 4,582,782 | 4/1986 | Valsecchi ............................ 430/527 |
| 4,585,730 | 4/1986 | Cho ................................... 430/527 |
| 4,604,414 | 8/1986 | Kato et al. .......................... 524/139 |
| 4,605,698 | 8/1986 | Briden ............................... 524/559 |
| 4,645,789 | 2/1987 | Dabi ................................. 524/379 |
| 4,689,359 | 8/1987 | Ponticello et al. ................... 524/523 |
| 4,695,532 | 9/1987 | Ponticello et al. ................... 430/533 |
| 4,699,964 | 10/1987 | Kato et al. ........................... 526/193 |
| 4,767,645 | 8/1988 | Linder et al. ........................ 427/389 |
| 4,859,570 | 8/1989 | Miller ............................... 430/529 |
| 4,916,054 | 4/1990 | Yoneyama et al. .................... 430/636 |
| 5,004,669 | 4/1991 | Yamada et al. ....................... 430/264 |
| 5,079,136 | 1/1992 | Tachibana et al. .................... 430/529 |
| 5,104,779 | 4/1992 | Saverin et al. ...................... 430/529 |
| 5,108,884 | 4/1992 | Shibata et al. ...................... 430/523 |
| 5,128,233 | 7/1992 | Beisswenger et al. ................. 430/529 |
| 5,202,223 | 4/1993 | Shibata et al. ...................... 430/529 |
| 5,232,824 | 8/1993 | Saverin et al. ...................... 430/529 |
| 5,252,445 | 10/1993 | Timmermann et al. ................ 430/529 |
| 5,254,445 | 10/1993 | Takamuki et al. .................... 430/529 |
| 5,284,741 | 2/1994 | Takabana et al. .................... 430/529 |
| 5,286,618 | 2/1994 | Tachibana et al. .................... 430/529 |
| 5,300,416 | 4/1994 | Yamanochi et al. ................... 430/529 |

FOREIGN PATENT DOCUMENTS 1496027  12/1977  United Kingdom .

OTHER PUBLICATIONS

C. R. Dick, *J. Organic Chemistry*, 32(1):72–75 (1967).
Jones, C. G., et al., *J. Organic Chemistry*, 30:1994–2001 (1965).

*Primary Examiner*—Janet C. Baxter
*Assistant Examiner*—Christopher G. Young
*Attorney, Agent, or Firm*—Darby & Darby, P.C.

[57] ABSTRACT

The photographic element having an antistatic layer composed of a polymer entity of (a) a water-soluble, electrically conductive polyelectrolyte, e.g., poly(sodium styrenesulfonate) homopolymer, and (b) a polymer derived from a polymerization of a monomer, such as a polyfunctional aziridine, in the presence of the polyelectrolyte. When applied to the surface of a support as a component of a coating mixture, the monomer polymerizes and entraps the polyelectrolyte molecules forming a distinct and permanent antistatic layer on the support. The electrically conductive polyelectrolyte molecules confer antistatic protection for photographic materials.

28 Claims, 3 Drawing Sheets

GELATIN NC
ANTISTAT LAYER
PET FILMBASE

ANTISTATIC LAYER FOR PHOTOGRAPHIC ELEMENTS COMPRISING POLYMERIZED POLYFUNCTIONAL AZIRIDINE MONOMERS

This invention relates in general to photographic materials and in particular to improved photographic materials having an antistatic layer.

BACKGROUND OF THE INVENTION

The buildup of static electrical charges on photographic films and papers is a problem of long standing in the photographic arts. These charges arise during the manufacture, handling and use of photographic recording materials and are affected by the conductivity and moisture conditions under which the material is handled. Accumulation of static charges is undesirable because it can cause irregular fog patterns in a photographic emulsion layer, an especially severe problem with high-speed emulsions. Additionally, static charges attract dirt to the photographic recording material and this can cause repellency spots, desensitization, fog and physical defects.

To overcome the adverse effects resulting from accumulation of static electrical charges, an antistatic layer is generally included in photographic materials. Typically, such antistatic layers are composed of materials which dissipate the electrical charge by providing a conducting surface. They must also adhere firmly to the film support, resist various chemicals such as processing solutions and they must not adversely affect the physical properties of the photographic element. Additionally, both the composition of antistatic layers and the method of their application to the photographic material substrate (backing) should be adapted for use with existing equipment in an existing plant. Use of hazardous chemicals should be avoided.

A large number of different materials have been proposed for use in antistatic layers of photographic products. For example, U.S. Pat. No. 2,527,267 describes an anti-stat layer comprised of an organic solvent soluble gelatin sulfonate complex; U.S. Pat. No. 3,791,831 describes an antistat layer composed of a mixture of sulfonated and carboxylated polymers; U.S. Pat. No. 4,582,782 discloses an anti-stat layer formed from a sulfonated polymer and an epoxysilane compound; U.S. Pat. No. 5,108,884 describes incorporation of a sulfonated polymer into the gelatin layer; and GB 1,496,027 describes an antistat layer which employs an acid form of a sulfonated polymer. Typically, the antistatic layers produced by conventional methods suffer from deleterious physical characteristics such as excessive swelling of layers incorporating the antistatic materials and poor adhesion of the antistatic layer to the support. Furthermore, diffusion of antistatic layer components into other layers diminishes clarity and antistatic performance. Many such antistatic layers are, additionally, not permanent as the antistatic components leach out on photographic processing. Finally, the antistatic layers are prepared by processes which generally require large volumes of volatile and toxic organic solvents, and/or expensive, volatile, toxic or corrosive organic reagents in generating the antistat layers.

In other approaches, crosslinking has played a role in an effort to improve antistatic protection. U.S. Pat. No. 4,147,550 describes internally crosslinked sulfonated microgel particles for dispersal in photographic layers. The crosslinking of antistatic polyelectrolytes, especially via aziridines, has been employed to improve the extent and permanence of the antistatic protection. The use of aziridine crosslinking agents is generally well-known. For example, U.S. Pat. No. 3,907,756 describes surface coating compositions prepared by reacting a polyfunctional aziridine with a carboxylic acid ester and U.S. Pat. No. 4,645,789 discloses the use of aziridines to crosslink carboxylate containing polymers. Relating directly to antistatic compositions, U.S. Pat. No. 4,225,665 discloses an antistatic layer containing a crosslinkable copolymer and a crosslinkable hydrophobic latex, and U.S. Pat. No. 4,859,570 describes a reaction product of a water-soluble crosslinkable electrically conductive copolymer and a polyfunctional aziridine as a crosslinking agent. The aziridine is said to interlink the copolymer via the carboxyl groups onto a support surface. U.S. Pat. No. 5,004,669 describes an antistatic layer containing a conductive copolymer having crosslinkable groups; and U.S. Pat. No. 5,079,136 describes an antistatic layer which utilizes a crosslinkable latex along with the conductive polymer. Antistatic layers derived from such compositions, however, suffer from poor wet adhesion characteristics and require high temperature curing steps, e.g., 100° C. to 160° C., to effect the crosslinking and to render the layer permanent.

Photographic materials provided with conventional antistatic layers, such as the ones described above, suffer from other significant disadvantages. For example, in certain instances the antistatic layer has inadequate antistatic properties, especially for high speed large grain emulsions, such as those used in phototypesetting papers. Inability of the antistatic layer to withstand photographic processing baths, which can involve temperatures of about 40° C. and higher, and consequent leaching of the components of the antistatic layer into the processing baths and forming an undesirable sludge in the processing solution is also a serious problem. In general, conventional antistatic coating compositions often do not provide an effective antistatic layer which is durable, non-tacky, resistant to blocking and abrasion, strongly adherent to the support and inexpensive to use and to apply to a photographic support. Also, certain prior art antistatic coatings require high temperature cures, which makes their use incompatible with existing manufacturing equipment and processes capable of operating only at low temperatures.

Because of the aforementioned deficiencies in conventional antistatic layers, it would be desirable to provide a novel antistatic layer, permanent against photographic processing solutions, and having satisfactory antistatic properties but not requiring the charged polyelectrolyte to be crosslinkable and/or a high temperature cure.

Accordingly, it is an object of this invention to provide a permanent transparent antistatic layer for a polymeric photographic material support. As defined herein, the term "permanent" means that the antistatic layer remains conductive (charge-dissipative) throughout the normal use cycle of the photographic element. Specifically, the antistatic property shall be retained even following passage of the photographic element through processing baths and hot air drying.

Another object of the invention is to provide an aqueous-based permanent antistatic layer which does not require a high-temperature thermal curing step. That is, the antistatic layer is curable at temperatures ranging between about 40° C. and about 50° C.

These and other objects of the invention will become apparent in light of the detailed description and examples below.

SUMMARY OF THE INVENTION

The present invention provides a photographic support material carrying a permanent and distinct antistatic layer comprising a polymer entity of: (a) a water-soluble, optionally crosslinkable, polyelectrolyte; and (b) a polymer derived from the polymerization of a monomer in the presence of the aforementioned polyelectrolyte. When a coating solution of the polyelectrolyte and monomer is applied onto the surface of a support and dried, the monomer polymerizes and entraps the polyelectrolyte molecules and, thus, forms a distinct and permanent charge-dissipative layer on the support. The electrically conductive polyelectrolyte confers antistatic protection for photographic materials. The present invention also provides photographic materials comprising such supports and methods of forming such antistatic layers on supports.

In a first embodiment of the invention, a distinct antistatic layer is provided which comprises a polymer entity of: (a) a water-soluble, electrically conductive polyelectrolyte, and (b) a polymer derived from polymerization of a monomer in the presence of the polyelectrolyte, wherein the weight ratio of the monomer to the polyelectrolyte is greater than 0.3 (or 30:100) but less than or equal to 1.0 (or 100:10–0). In this instance, any suitable temperature may be used for preparing the antistat layer which is sufficient to polymerize the monomer in the presence of the polyelectrolyte and form a distinct antistatic layer. While the monomer may or may not form covalent crosslinks with polyelectrolyte, the monomer is present in an amount sufficient to form a polymer in the presence of the polyelectrolyte, as evidenced by the distinct layer.

In a second embodiment of the invention, a distinct antistatic layer is provided which comprises a polymer entity of: (a) a water-soluble, electrically conductive polyelectrolyte having no ionizable functional groups other than salts of sulfonic acid or salts of hydrogen sulfate, and (b) a polymer derived from polymerization of a polyfunctional aziridine monomer in the presence of the polyelectrolyte. In this instance, any suitable temperature may be used for preparing the antistat layer which is sufficient to polymerize the monomer in the presence of the polyelectrolyte and form a distinct antistatic layer, but not to cause formation of covalent linkages between the monomer and polyelectrolyte.

DETAILED DESCRIPTION OF THE INVENTION

Figure 1:
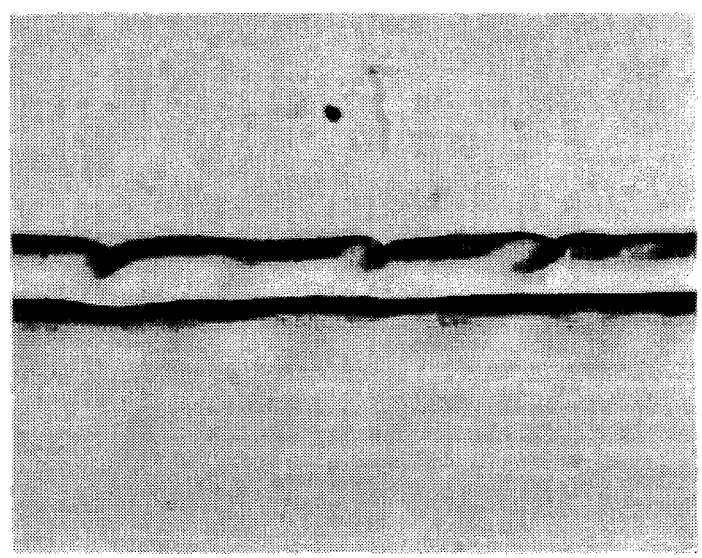
FIG. 1 is an optical micrograph (1000X magnification) of a cross-sectional view of test sample $2^a$ (Table 1) prepared by coating a gelatin (non-curl) layer over a layer of a poly(sodium styrenesulfonate) (NaPSS) homopolymer (Versa TL-501, MW 1,000,000)/XAMA-7 at a weight ratio of 100:4 on a polyethylene terephthalate (PET) support as described in Example 1. No distinct antistatic layer is visible.
Figure 2:
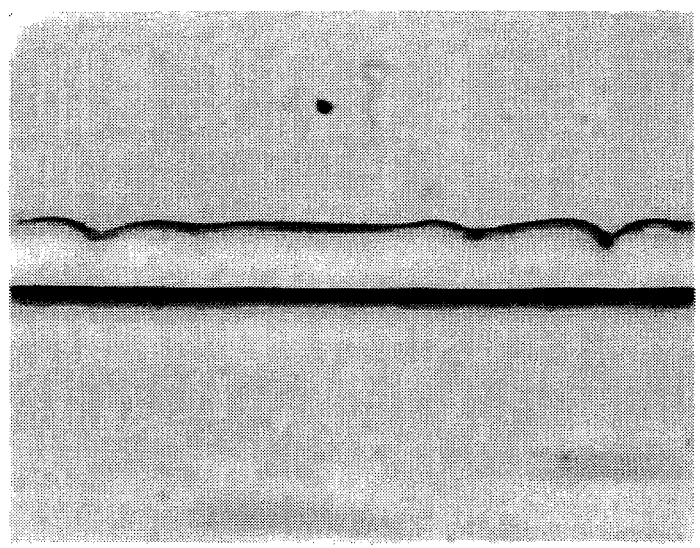
FIG. 2 is an optical micrograph (1000X magnification) of a cross-sectional view of test sample $3^a$ (Table 1) prepared by coating a gelatin (non-curl) layer over a layer of NaPSS homopolymer (Versa TL-501, MW 1,000,000)/XAMA-7 at a weight ratio of 100:9 on a PET support as described in Example 1. No distinct antistatic layer is visible.
Figure 3:
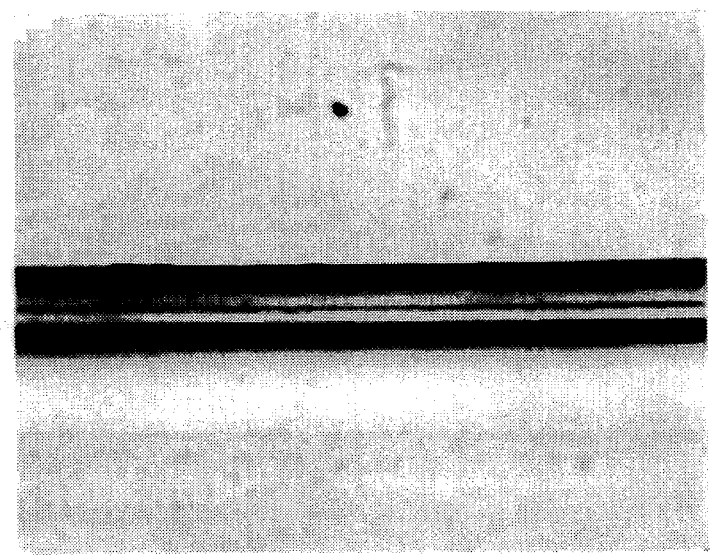
FIG. 3 is an optical micrograph (1000X magnification) of a cross-sectional view of test sample $4^a$ (Table 1) containing a gelatin non-curl overcoat layer, a distinct intermediate antistatic layer of NaPSS homopolymer (Versa TL-501, MW 1,000,000)/XAMA-7 at a weight ratio of 100:17 on a PET support as described in Example 1.

All patents, patent applications, and literature publications cited herein are incorporated by reference in their entirety. In case of conflict, the present disclosure will control.

The present invention arose from the discovery that a polymer entity of: (a) a water-soluble, electrically conductive polyelectrolyte, e.g., a homopolymer of sodium styrenesulfonic acid, and (b) a polymer derived from the polymerization of a monomer (e.g. a polyfunctional aziridine monomer) in the presence of the polyelectrolyte unexpectedly provides an antistatic layer which is not only effective in providing protection against static charges but is highly resistant to the aqueous processing baths used in processing photographic materials. In contrast to conventional antistatic layers, the polymer entity used in preparing the antistatic layer is made and optionally cured at low-temperatures, e.g., between about 40° C. and about 50° C. The antistatic layer of the invention is durable, strongly adherent to the support, and does not contaminate manufacturing equipment or processing baths.

Without being bound by any theory of operation for the invention, it is believed that the in-situ polymerization of the monomer, e.g., a polyfunctional aziridine, in the presence of the polyelectrolyte leads to a polymer network which entraps the polyelectrolyte. The polymer entity resulting from the polymerization is believed to be a semi-interpenetrating polymer network (SIPN). SIPNs, in general, are known in the art and have been described, for example, in "Interpenetrating Polymer Networks and Related Materials" L. H. Sperling, Plenum Press, 1981. Thus, the antistatic material of tire present invention is fundamentally different from materials employing aziridines as cross-linking agents (or from any antistatic material employing other types of crosslinking agents between a polyelectrolyte and another polymer). In fact, there is experimental evidence (data not shown) that all of the aziridine used in forming the antistatic material of the present invention polymerizes in that no aziridine monomer has been extracted from these materials within the experimental limits of the test performed. Based on this, and on the fact that effective antistatic properties are associated with formation of a distinct transparent layer, it is believed that all the aziridine added is polymerized. This is dramatically illustrated in embodiments wherein the monomer is not known to react with functional groups of the polyelectrolyte (or does not so react at the particular polymerization temperatures used). The term "polymer entity" used herein to describe the results of the polymerization of the monomer in the presence of the polyelectrolytes.

The antistatic layer is prepared by coating a support with an aqueous antistatic coating solution prepared from a mixture of (a) a water-soluble, optionally crosslinkable, polyelectrolyte; (b) an acid polymerizable monomer; and (c) an acid catalyst. The coating solution has total solids concentration ranging between about 1 and about 30% (w/v).

The polyelectrolyte solution, the monomer and acid catalyst may be combined, with mixing, and immediately used as a coating solution in a batch-wise process. A representative example of a batch-wise process is described in Example 1. A particularly reactive monomer may, however, substantially decompose on standing in a batch-wise process. In such instances, the reactive monomers, the polyelectrolyte solution and acid catalyst may be segregated and mixed in a continuous in-line process immediately prior to coating. A representative example of a continuous in-line process is shown in Example 2.

Suitable, but non-limiting, examples of monomers include polyfunctional aziridines such as pentaerythritol-tri-[β-(N-aziridinyl)propionate], trimethylol propane-tri-[β-(N-aziridinyl)propionate], and 1-aziridinepropanoic acid, 2-methyl-, 2-ethyl-2-[[3-(2-methyl-1-aziridinyl)-1-oxopropoxy]-methyl]-1,3-propanediyl ester (available as PFAZ-322, Sybron Chemicals, Inc., Birmingham, N.J.). Additional examples of polyfunctional aziridines for use in the invention are described in U.S. Pat. Nos. 4,645,789 and 4,859,570. The preferred monomers for use in the invention are pentaerythritol-tri-[β-(N-aziridinyl) propionate] and trimethylol propane-tri-[β-(N-aziridinyl)propionate] which are commercially available as XAMA-7 and XAMA-2, respectively, from Sanncorr Industries (Massachusetts, USA). Aziridines readily undergo a facile low-temperature polymerization in aqueous solution in the presence of acidic or alkylating catalytic agents. See, for example, "Polymerization of Aziridines" by G. E. Ham in *Polymeric Amines and Ammonium Salts* E. J. Goethals ed., Pergamon Press (1980); C. R. Dick (1967) *J. Org. Chem.*, Vol. 32, 72; and G. D. Jones et al. (1966) *J. Org. Chem.*, Vol. 30, 1994.

In preparing the coating solution, the monomer may optionally be dissolved in an inert diluent to facilitate mixing. A monomer solution may be prepared by dissolving the monomer in a water-miscible solvent, preferably anhydrous, in which the monomer is stable. Suitable, but non-limiting, examples of solvent include isopropanol, polyethylene glycol of MW 400, and diethylene glycol. The preferred solvent for use in the invention is isopropanol. The concentration of the monomer in the monomer solution ranges between about 20% and about 90%, preferably about 50% (w/w). After mixing with the aqueous polyelectrolyte, the solution concentration of isopropyl alcohol is generally about 0.9%.

As defined herein, polyelectrolytes are electrically conductive polymers having charged groups attached to the polymer chain. The polyelectrolytes are the main charge dissipative component of the antistatic layer. Polyelectrolytes are described in Chapter 1 of "Water-Soluble Synthetic Polymers: Properties and Behavior", Volume II, CRC Press (1983). The polyelectrolytes may be optionally crosslinkable, i.e., they may have one or more types of crosslinkable charged or neutral functional groups. Depending on their nature, the nature of the monomer, and the polymerization reaction conditions, these functional groups may or may not form covalent bonds with the monomer.

In practicing the invention, anionic polyelectrolytes, e.g., polymers having negatively charged ionizable groups, are preferred. Anionic polyelectrolytes having ionizable salts of sulfonic acid or hydrogen sulfate attached to the polymer chain are particularly preferred. Univalent cations are the preferred counterions for the anionic polyelectrolytes. Representative cations include sodium ion, potassium ion, lithium ion, cesium ion and ammonium ion. A preferred cation for use in the invention is sodium ion.

Representative, but not limiting, examples of polyelectrolytes useful in the invention include homopolymers and copolymers of sodium styrenesulfonate, e.g., poly (sodium styrenesulfonate-co-acetoacetoxyethyl methacrylate), poly (sodium styrenesulfonate-co-maleic anhydride) and poly (sodium styrenesulfonate); homopolymers and copolymers of sodium vinylsulfonate, e.g., poly (sodium vinylsulfonate) and poly(sodium vinylsulfonate-co-potassium vinylsulfinate); homopolymers and colpolymers of sodium 2-acrylamido-2-methyl-1-propane sulfonate, e.g., poly(sodium 2-acrylamido-2-methyl-1-propanesulfonate) and poly(sodium 2-acrylamido-2-methyl-1-propanesulfonate)-co-poly (4-amino styrene); homopolymers and copolymers of sodium polyvinylsulfate; homopolymers and copolymers of sodium 2-sulfoethyl methacrylate, e.g., poly(sodium 2-sulfoethyl methacrylate) and poly (2-sulfoethyl methacrylate-co-acetoacetoxyethyl methacrylate); homopolymers and copolymers of sodium 3-sulfopropyl methacrylate, e.g., poly(sodium 3-sulfopropyl methacrylate) and poly(3-sulfopropyl methacrylate-co-acetoacetoxyethyl methacrylate); homopolymers and copolymers of sodium 3-sulfopropyl acrylate, e.g., poly(sodium 3-sulfopropyl acrylate) and poly (3-sulfopropyl acrylate-co-acetoacetoxyethyl methacrylate); poly (sodium 2-methacryloyloxyethane-1- sulfonate); poly (sodium 3-methacryloyloxypropane-1-sulfonate); poly[sodium 3-(vinyloxy) propane-1-sulfonate]; and poly(sodium 4-vinylphenyl sulfate). Examples of useful aromatic sulfonated polyelectrolyte homopolymers and copolymers are described in U.S. Pat. No. 5,153,113. In practicing the invention, homopolymers and copolymers of sodium styrenesulfonate, e.g., poly(sodium styrenesulfonate-co-acetoacetoxyethylmethacrylate) and poly(sodium styrenesulfonate-co-maleic anhydride), are particularly preferred. Most preferred are the homopolymers of sodium styrenesulfonate, e.g., poly(sodium styrenesulfonate) (NaPSS), having a number average molecular weight ranging between about 30,000 and about 1,000,000 and preferably about 1,000,000.

Prior to making the coating mixture, the polyelectrolyte is preferably dissolved or dispersed in water, preferably deionized, at a concentration ranging between about 1% and about 25%, preferably about 2% (w/v).

The coating mixture of polyelectrolyte, acid polymerizable monomer, and acid catalyst generally has a pH ranging between about 6.0 and about 9.0, preferably between about 6.5 and about 8.5, and most preferably about pH 7.5. Suitable, but non-limiting, examples of acid catalysts include sulfuric acid, methane- or toluenesulfonic acid, and 2-(N-morpholino) ethane sulfonic acid. The amount of acid catalyst employed in the mixture shall be sufficient to bring the coating mixture to the aforementioned pH ranges.

If desired, the antistatic coating mixture may include additional additives such as anticracking or plasticizing agents, e.g., polyethylene glycol, polyethylene oxide, or polyvinyl alcohol, in amounts ranging between about 2% and about 20%, preferably about 5%, of the weight of the polyelectrolyte. The coating mixture may also contain matting agents, e.g., silica, in an amount sufficient to give a laydown ranging between about 0.01 and about 1.0 g/m². An anionic or nonionic surfactant, preferably a anionic surfactant such as Triton X-200 (an alkylarylethoxylated sulfonate), is preferably included in the coating composition as a coating aid in an amount ranging between about 0.5% and about 4%, preferably about 2% (w/v).

The antistatic layer is prepared by applying the coating solution onto a support by any conventional technique suitable for the application of aqueous coating compositions. Suitable, but non-limiting, coating techniques include spray coating, dip coating, swirl coating, extrusion hopper coating, curtain coating, air knife coating, cascade coating, gravure coating or other coating technique. The thickness of the coated layer will depend upon the particular requirements of the photographic material involved. The dry weight coverage of the antistatic layer generally ranges between about 0.20 and about 2 $g/m^2$, preferably ranging between about 1.0 and about 1.4 $g/m^2$.

The antistatic layer of the present invention may be incorporated at any suitable position within a photographic material so as to provide effective protection against static charges. However, in practice, the antistatic layer is applied as the innermost layer of the material on the side opposite the radiation-sensitive photographic emulsion layer or layers.

Suitable, but non-limiting, support materials include polymeric films such as cellulose nitrate film, polyvinyl acetal film, polycarbonate film, polystyrene film, or polyester film. Polyester films, especially suitably subbed and/or discharge treated polyethylene terephthalate (PET) film, are especially useful and preferred in practicing the invention. Photographic papers as support material, especially those coated on one or both sides with a coating of a hydrophobic polymeric material, are also advantageously protected against static with the antistatic layers of this invention. Such polymer-coated photographic papers are well known and include without limitation papers coated with styrene polymers, cellulose ester polymers, linear polyesters, and polyolefins such as polyethylene or polypropylene. Additional supporting materials are described, for instance, in Research Disclosure No. 308119, dated December 1989 (page 1009).

When the antistatic layer is placed on a polyester film support, an intermediate resin or polymer-gelatin subbing layer may be used to improve the bonding of the antistatic layer to the support. Suitable resin subbing compositions include, for example, interpolymers of vinylidene chloride such as vinylidene chloride/acrylonitrile/acrylic acid terpolymers or vinylidene chloride/methyl acrylate/itaconic acid terpolymers. Subbing compositions based on polymer-gelatin crosslinkable with a gelatin hardener, such as the ones described in U.S. Pat. Nos. 4,689,359 and 4,695,532, are especially useful and preferred in this invention.

If polyolefin-coated paper supports are used, the polyolefin surface is preferably energy treated by a suitable method, e.g., corona discharge, instead of applying a subbing layer to promote adhesion to the antistatic coating composition.

Thereafter, the layer of coating solution on the support is dried so as to drive off water and other solvents and concentrate the solution. During the drying process, the monomer undergoes polymerization to form a polymer network which entraps and retains the polyelectrolyte, thus forming the antistatic layer. It is believed that the monomer, e.g., a polyfunctional aziridine, completely polymerizes under the aforementioned conditions as a distinct layer forms and no detectable amounts of unreacted monomer are obtained upon extracting the antistat layer with isopropanol.

At neutral pH, the network formed by the polymerization of such polyfunctional aziridines is positively charged. The coulombic charge in the polymer network is preferably opposite in sign to the coulombic charge on the entrapped polyelectrolyte which further aids in its retention.

A conventional gelatin-containing non-curl layer may be optionally coated on the anti-static layer of the invention to prevent curling of the support before, during, or after processing. The overcoat (non-curl) layer contains any of the widely known gelatin crosslinking agents, e.g., of the aldehyde, vinyl sulfone or triazine type. The non-curl layer may optionally contain antihalation dyes, matting agents and other conventional additives typically used in gelatin-based non-curl compositions.

An antistatic layer containing the gelatin non-curl overcoat may be optionally cured at a temperature ranging between about 40° C. and about 50° C., preferably about 40° C., for a period of time ranging between about 1 and about 3 days, preferably about 3 days. The clear antistatic layer has good adherence, resists wash off, and has low surface resistivity and rapid charge decay properties.

In the first embodiment of the invention, a distinct antistatic layer is provided which comprises a polymer entity of: (a) a water-soluble, electrically conductive, polyelectrolyte and (b) a polymer derived from polymerization of a monomer in the presence of the polyelectrolyte, wherein the weight ratio of the monomer to the polyelectrolyte is greater than 0.3 (or 30:100) but less than or equal to 1.0 (or 100:100). The weight ratio of polyelectrolyte to monomer preferably ranges between about 100:40 and about 100:100, and most preferably ranging between about 100:40 and about 100:50. Thus, even if some of the monomer is able to cross-link with the polyelectrolyte, there is sufficient amount of monomer to polymerize and to form a distinct transparent antistatic layer.

In this embodiment, the coating solution may be applied and dried at any suitable temperature for any period of time which is sufficient to promote polymerization of the monomer in the presence of the polyelectrolyte and form a distinct antistat layer, but not to degrade or substantively diminish antistatic performance. However, it is preferred that the coating solution be applied onto the support at temperatures ranging between about 10° C. and about 40° C., most preferably about 20° C., and the resulting coating layer is dried at temperatures ranging between about 30° C. and about 60° C., preferably about 45° C., for a period ranging between about 2 and about 20 minutes, preferably about 10 minutes. Polymerization of the monomer preferably occurs at temperatures ranging between about 10° C. and about 60° C., more preferably between about 30° C. and about 60° C.

In a second embodiment of the invention, a distinct antistatic layer is provided which comprises a polymer entity of: (a) a water-soluble, electrically conductive polyelectrolyre having no ionizable groups other than salts of sulfonic acid or hydrogen sulfate groups, (b) a polymer derived from polymerization of a polyfunctional aziridine monomer in the presence of the polyelectrolyte. The weight ratio of the polyelectrolyte to the monomer in this embodiment generally ranges between about 100:20 and about 100:100, preferably between about 100:40 and about 100:50 and most preferably about 100:46.

In this embodiment, the coating solution may be applied and dried at any suitable temperature for any period of time which is sufficient to promote polymerization of the monomer in the presence of the polyelectrolyte and form a distinct antistat layer. However, it is preferred that the coating solution be applied onto the support at temperatures ranging between about 10° C. and about 40° C., most preferably about 20° C. and the resulting coating layer be dried at temperatures ranging between about 30° C. and about 60° C., most preferably about 45° C. The drying period generally ranges between about 2 and about 20 minutes, preferably about 10 minutes.

In the most preferred embodiment of the invention, the antistatic layer is comprised of a SIPN of (a) a homopolymer of sodium styrenesulfonate as the water-soluble polyelectrolyte and (b) a polymer derived from a polyfunctional aziridine, e.g., pentaerythritol-tri-[β-(N-aziridinyl)propionate], as the monomer, at a weight ratio of polyelectrolyte to monomer of about 100:46.

Photographic elements are provided which contain the inventive antistatic layer on a support. The support may be coated with one or more silver halide emulsion layers which may include ingredients such as optical brighteners, sensitizers, antifoggants, and stabilizers. Non-limiting examples of ingredients, components, and applications of photographic elements suitable for use with the inventive antistatic layer are described in Research Disclosures No. 308119, dated December 1989 (pages 993–1011), and No. 33355, dated January 1992 (pages 41–51), which are incorporated by reference in their entirety. For an additional description, see L. F. Mason "Photographic Processing Chemistry", Focal Press, London, 1966; "Processing Chemicals and Formulas", Publication J-1, Eastman Kodak Co., 1973; "Photo-Lab Index", Morgan and Morgan, Inc., Dobbs Ferry, N.Y., 1977; and "Neblette's Handbook of Photography and Reprography Materials, Processes and Systems", Van Nostrand Reinhold Company, 7th edition, 1977. In particular, the nature of the layers of the photographic element that are not in contact with the antistat layer of the invention does not affect the antistat properties of this layer.

Photographic elements containing the inventive antistatic layer may be processed with any suitable processing systems and techniques known in the art. Suitable, but non-limiting, examples of developers are described in the aforementioned Research Disclosures. The choice of processing temperature and the processing time may be appropriately selected depending on the particular developer as is well-known to one skilled in the art. In general, the processing temperature ranges between about 18° C. and about 50° C., preferably about 36° C. The processing time is generally limited to about 75 seconds. Tray processing, as well as machine processing, may be used for processing the photographic elements of the invention.

Classical "lith"-developers may be used in processing the photographic elements of the invention. These developer systems, generally having a low free sulphite content and including a hydroquinone as the sole developing agent, produce sharp-edged pictures on halftone and line copies.

Rapid access developer systems, however, are preferably used in developing the photographic element containing the inventive antistatic layer. These developers contain a combination of two superadditive developing agents and a high sulphite content. Such developers provide a practical advantage of wide processing latitude (development time and/or temperature) and exhibit excellent chemical stability.

The developer compositions may include developing agents such as: hydroquinones and derivatives, e.g., hydroquinone, chlorohydroquinone, bromohydroquinone, iodohydroquinone, catechol, pyrogallol, gallacetophenone, alkylhydroquinone (toluhydroquinone), gentisic acid, esters of gallic acid, and dihydroxynaphthalenes; aminophenols such as o- and p-aminophenol, N-substituted and N,N-disubstituted o- and p-aminophenols; phenyl-3-pyrazolidones; 3-aminopyrazolines; pyrazolones; glycine; pyrimidines; amino-uracils; naphthalene-developing agents; phenylenediamines; tetrahydroquinolines; cycloalkenones; reductones, e.g., ascorbic acids-oxytetronic acids; coumarins; hydrazine derivatives and hydroxylamines; metal-ion developers, including salts of iron, titanium, vanadium, copper and chromium. These developing agents may be used alone or in combination with each other, e.g., hydroquinones with aminophenols or phenyl-3-pyrazolidones.

Additionally, the developer composition may contain alkali such as sodium-, potassium- or lithium hydroxides; buffer salts such as sodium salts of carbonate, borate, sulfite, phosphate, ammonia, primary, secondary and tertiary amines, ammonium compounds such as phenethyl picolinium bromide; aminoalcohols; preservatives such as sulfite salts, metabisulfite salts, carbonyl bisulfite compounds (e.g., formaldehydebisulfite), sulfite esters, sulfonates, sulfinates, (poly)-quaternary ammonium bisulfites, pyrosulfites and sulfites; reductones (e.g., ascorbic acid, thioglycolic acid); saccharides and polysaccharides; oximes; phenols and fluorinated alcohols; inorganic antifoggants such as sodium or potassium salts of chloride, bromide and iodide; organic antifoggants such as alkyl-, aryl-, alkoxy-, acyl-, acylamino-, carbamoyl-, carboxyalkyl-, sulfamoyl-, hydroxy-, amino-, alkylthio-, mercapto-, nitro-, chloride-, bromide-, iodide-, cyano-, thiol, thione- (including combinations of the before-mentioned substituents) derivatives of: indazoles, triazoles, tetrazoles, imidazoles, benzooxazoles, benzothiazoles, benzoimidazoles, benzotriazoles, mercaptotetrazoles, indolizines, triazaindolizines, mercaptothiazoles, mercaptobenzimidazoles, mercaptothiadiazoles, aminotriazoles, mercaptopyrimidines, mercaptotriazines, benzothiazolines, thiadiazoles, thiazolines, oxazolines. Thioketo compounds such as oxazolinethione thiosulfonic acids, thiosulfinic acids, and sulfonates; azaindenes, e.g., triazaindenes, tetrazaindenes, and pentazaindenes.

The developing solution may also contain inorganic sequestering agents, e.g., polyphosphates; organic sequestering agents, e.g., organic polyphosphates (e.g., turpinal), nitrogen-containing organic acids (e.g., ethylene diaminetetraacetic acid (EDTA), nitriloacetic acid (NTA), and diethylenetriaminepentaacetic acid (DTPA); solvents such as alkyl-, aryl, and allyl alcohols, diols and triols, e.g., 1-propanol, 1-butanol, 2-methyl-1-propanol, benzylalcohol, methoxypropanol, methoxybutanol, ethoxypropanol, ethylene glycol, glycerol, diethyleneglycol, ethyleneglycolmonoethylether, ethyleneglycoldimethylether, ethyleneglycolmonoacetate, and 1,2,3-propanetriol; ethers, e.g., diethylether, tetrahydrofuran, 1,4-dioxane, diglyme; aldehydes and ketones, e.g., formaldehyde, acetone, methylethylketone, diethylketone, pinacolone, 1,3-cyclopentadione, methylphenylketone, and butylmethylketone; carboxylic acids, e.g., acetic acid, butanoic acid, benzoic acid, phthalic acid, and gluconic acid; esters, e.g., methylpropionate, ethylacetate, butylacetate, phenylacetate; amides, e.g., formamide, dimethylformamide, acetamide, N-methyl-2-pyrrolidone, tetramethylurea, and 1,3-dimethyl-2-imidazolidone; amines, e.g., ethylamine, ethylenediamine, triethylamine, pyridine, glycine, benzylamine, polyethyleneimine, and 1,4-cyclohexanebis(methylamine); alkanoamines, e.g., diethanolamine, 2-diethylamino-1-ethanol, 5-amino-1-pentanol, hydantoic acid, o-aminobenzoic acid, o-aminobenzyl alcohol, n-butyldiethanolamine, and β-phenethyl alcohol; sulfoxides, e.g., dimethylsulfoxide and tetramethylenesulfone.

Development accelerators such as organic amines, e.g., ethylenediamine, β-phenylethylamine, cyclohexylamine, and piperidine; neutral salts, e.g., potassium nitrate, sodium sulfate chromium and thallous salts; and sulfur-containing organic compounds, e.g., aliphatic thioethers.

Development regulators such as polyethylene glycols having a molecular weight up to 20,000; polythioethers; condensation products of polyethyleneglycols and alkyl phosphites; condensation products of polyethyleneglycols and aliphatic amines; and carboxylic, sulfonic or phosphoric esters of polyethyleneglycols, may also be used. These polymeric compounds can be ionic, non-ionic, branched and/or substituted.

The developing solutions may also include cationic compounds, e.g., organic ammonium and phosphonium salts; anionic compounds, e.g., organic sulfates, sulfonates, carboxylic acids and their esters and fluoro-derivatives; and non-ionic compounds, e.g., glycosides, and ethyleneoxides.

The processed photographic element may be fixed by any suitable conventional fixing compositions. Representative examples of fixers are described in the aforementioned Research Disclosures. In general, these compositions contain fixing agents such as thiosulfates, thiocyanates and organic sulfur compounds. To optimize the fixing process, other addenda may be included such as preservatives (e.g., sulfites), halides (e.g., iodide), buffer salts (e.g., sodium acetate), acids (e.g., acetic acid), sequestering agents (e.g., EDTA) and etching agents (e.g., ferrocyanides). Optional hardening agents (e.g., aluminum sulfate or zirconium acetate) may also be used. In practicing the invention, non-aluminum containing fixing solutions are preferred.

The following Examples are illustrative of the present invention, but do not serve to limit its scope.

EXAMPLE 1

Solutions of the monomer, pentaerythritol-tri-[β-(N-aziridinyl)propionate] (XAMA-7, Sanncorr Industries Massachusetts, USA)), were prepared in anhydrous isopropyl alcohol at 20° C. The monomer solutions, ranging in concentration from 6% to 50%, were each mixed into a 2% acidified (pH=1.8, T=20° C.) aqueous solution of poly(sodium styrenesulfonate) homopolymer (PSS) (Versa TL 501, MW=1,000,000, National Starch, USA), and containing 0.1% Olin 10G nonionic surfactant, a nonylphenol-based nonionic surfactant which is available from Olin Chemical Company (Stamford, Conn., USA). The pH of the coating solution was adjusted to pH 7.5 with 3N sulfuric acid and was used immediately in substrate coating. The final weight ratios of the coating solutions are shown in Table 1. Throughout the mixing and coating steps, the solutions were maintained at 20° C. ±5° C. The time interval from the acid activation of the monomer on mixing until coating on the web was less than 5 minutes. In another sample, poly(sodium styrenesulfonate) homopolymer (Versa TL-77, MW=75,000) was used, instead of Versa TL-501, in preparing the coating solutions.

The coating solutions were cascade-coated onto a subbed polyethylene terephthalate (PET) support and dried in-line at 45° C. for 10 minutes to give antistat layers at a dry coating weight of 1.0g polyelectrolyte/m². Thereafter, the antistatic layers were overcoated with a conventional gelatin non-curl formulation containing gelatin at 3.0 g/m², dried 7.5 minutes at 45° C. and cured at 40° C. for three days. For comparison purposes, the gelatin non-curl formulation was coated at 3.0 g/m² directly onto the subbed support without an intervening antistat layer (test sample #6 in Table 1). The films were processed in a developer composition and fixed with a non-hardening fixer composition described below.

| Composition of Developer | |
|---|---|
| $H_2O$ | 800 mL |
| $K_2S_2O_5$ | 38 g |
| Hydroquinone | 17 g |
| Ethylene Glycol | 8 ml |
| NaBr | 2.44 g |
| Alkanolamine | 1.6 mL |
| Boric Acid | 6 g |
| Phenidone | .4 g |
| Water to 1.0 liter, adjust to pH 11.2 | |

The foregoing developer also contains restrainers and antisludging agents totalling less than 1 g.

| Composition of Non-hardening Fixer | |
|---|---|
| 60% $NH_4S_2O_3$ | 765 mL |
| $Na_2SO_3$ | 72 g |
| Boric Acid | 4 g |
| Glacial Acetic Acid | 73 mL |
| EDTA | 5 g |
| Water to 1.0 liter | |
| pH 5.5 | |

The effectiveness of the antistatic layers in dissipating static charge is determined by measuring the surface resistivity (SR) at a specific temperature and humidity. In general, the smaller the SR values, the better the static protection of the photographic material. In Table 1 below, the SR values for various samples were obtained before and after processing. The notation "E" refers to "times ten to a given power." For example, "10E12" means $1.0 \times 10^{12}$.

In Table 1, films having SR values greater than $10^{13}$ after processing are unprotected whereas films having SR values less than $1.0 \times 10^{12}$ are well protected against static buildup. An SR value of the order of $10^{11}$ or less is particularly preferred. The SR values are given for unprocessed films ((SR)u), and for films after processing in the foregoing developer ((SR)p), fixer, and water wash. All SR values were measured in a controlled humidity chamber at 30% RH and 25° C. with the Hiresta-IP resistivity meter (Mitsubishi Petrochemical Co.) using either the HRS or HR100 surface resistivity probes. Haze was determined with a Gardener Haze meter and values greater than 2.4 appeared cloudy and are unacceptable for end use. High haze values result from the unwanted diffusion of the PSS polymer from the antistat coating into the gelatin NC where it is incompatible. Swelling of the coatings resulting in a film product having a thickness in excess of 15 microns (relative to a thickness of about 4 to 5 micron of a dry film product) makes the film difficult to dry after processing and thus is unacceptable for end use. Again, excessive swelling results from the unwanted diffusion of the PSS into the NC layer.

TABLE 1

| TEST SAMPLE | XAMA/PSS wt. ratio | (SR)u[d] | (SR)p[d] | HAZE | ANTISTAT LAYER | SWELL[c] |
|---|---|---|---|---|---|---|
| 1[a] | 0.00 | 2.1E12 | 1.9E13 | 10.3 | NO | 18.9 |
| 2[a] | 0.04 | 2.0E12 | 1.7E13 | 9.0 | NO | 18.0 |
| 3[a] | 0.09 | 1.8E12 | 1.1E13 | 5.9 | NO | 18.1 |
| 4[a] | 0.17 | 1.1E11 | 1.4E12 | 2.6 | YES | 12.8 |
| 5[a] | 0.34 | 8.8E9 | 8.1E10 | 2.3 | YES | 10.9 |
| 1[b] | 0.00 | 2.4E12 | 3.2E13 | 3.0 | NO | 19.1 |
| 2[b] | 0.04 | 3.3E12 | 4.5E13 | 3.1 | NO | 17.9 |
| 3[b] | 0.09 | 3.1E12 | 4.8E13 | 2.6 | NO | 16.0 |
| 4[b] | 0.17 | 2.9E12 | 4.6E13 | 2.4 | YES | 14.0 |
| 5[b] | 0.34 | 1.4E10 | 1.1E11 | 2.4 | YES | 11.0 |
| 6[e] | — | 8.1E13 | >1E14 | 2.3 | — | 7.1 |

[a]Versa TL-501.
[b]Versa TL-77.
[c]Swell is reported in microns.
[d]SR is in ohms/sq.
[e]Gel NC only.

Figure 4:
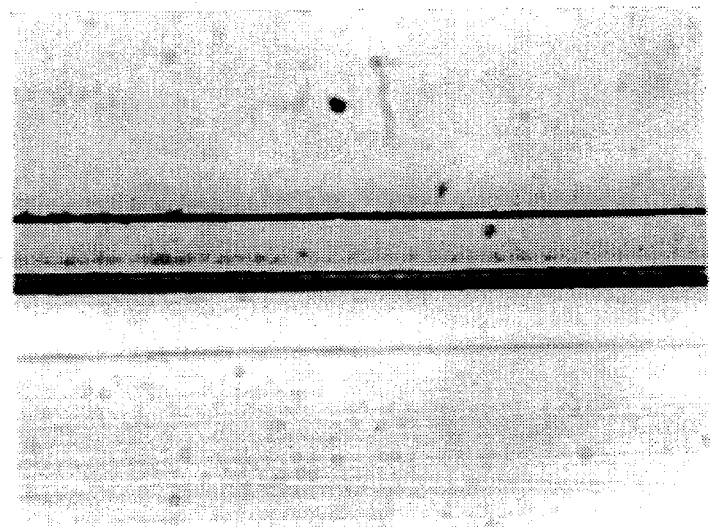
FIG. 4 is an optical micrograph (1000X magnification) of a cross-sectional view of test sample $5^a$ (Table 1) containing a gelatin non-curl overcoat layer, a distinct intermediate antistatic layer of NaPSS homopolymer (Versa TL-501, MW 1,000,000)/XAMA-7 at a weight ratio of 100:34 on a PET support as described in Example 1.

The presence of a discrete antistat layer under gel NC was determined by optical microscopic analysis of cross-sectioned samples. Cross sections of coated composite test sample nos. 2[a], 3[a], 4[a], and 5[a], swollen and magnified 1000X, are shown in FIGS. 1 to 4, respectively. No distinct antistatic layers were observed for test samples 1[a], 2[a], and 3[a] as shown for the latter two samples in FIGS. 1 and 2. The high level of haze and swelling prior to processing confirms the diffusion of the charged polymer into the gelatin NC in these test samples. Test samples 3[a] and 3[b] are only marginally protected before processing and are unprotected against static buildup after processing as shown in Table I. In test samples 4[a] and 4[b], the coating XAMA-7/PSS weight ratio was barely sufficient to form an antistatic layer and was found to be inadequate to fully retain the PSS. Although the antistatic layer in Sample 4[a] swells during processing, this material may be usable for certain applications. As shown in FIG. 4 and Table 1, test sample 5[a] has a discrete antistatic layer under the NC gel layer which is permanent against photographic processing.

Thus, permanent antistatic layers can be obtained at coating and drying temperatures not exceeding 50° C., provided that the weight ratio of XAMA-7 to polyelectrolyte is greater than 0.17, preferably at ratios of 0.34 and higher. FIG. 4 (test sample 5[a]) clearly illustrates that a permanent antistatic layer can be made on a support with a non-crosslinkable homopolymer. Coatings of the invention are well protected against static buildup both before and after processing. The 0.09 weight ratio of XAMA-7 to polyelectrolyte in test samples 3[a] and 3[b] is too low to form a permanent antistatic layer.

It is also evident, from the data in Table I, that the higher molecular weight homopolymer, VERSA TL-501, is a more effective antistatic polyelectrolyte and is preferred.

EXAMPLE 2

Solutions #1 and #2 were prepared as follows: Solution #1

| Solution #1 | | |
|---|---|---|
| Ingredient | Function | Amount |
| 25% Aqueous solution of Versa TL-501 NaPSS Homopolymer | Electric charge dissipator | 3.45 L |
| Water | — | 49 L |
| Triton X-200 | Coating aid | 0.42 L |
| 3N Sulfuric Acid | Polymerization catalyst | 0.21 L |

| Solution #2 | | |
|---|---|---|
| Ingredient | Function | Amount |
| Pentaerythritol-tri-[β-(N-aziridinyl)-propionate] (i.e., XAMA-7) | Monomer | 0.25 kg |
| Anhydrous isopropanol | Inert Diluent | 0.25 kg |

Titrimetric analysis showed solution #2 to be stable for at least 24 hours at 20° C. The monomer solution #2 was injected, with mixing, into the antistat solution #1 "in-line" immediately prior to cascade coating at flow rates which gave a XAMA-7/NaPSS weight ratio of 0.46. From the static mixing chamber, activated coating solution (pH=7.5) flowed through a 10 micron polypropylene filter and directly into the coating head. Throughout the mixing and coating steps, the solutions were maintained at 20° C. ±5° C. The time interval from the acid activation of the monomer on mixing to coating on the web was about 10 seconds.

The antistat layer of this example, coated at 0.865 g polyelectrolyte/m$^2$, was dried in line after coating for 7.5 minutes at 45° C. and was not thermally cured. A non-curl gelatin layer, prepared as described in Example 1, was coated over the anti-stat layer at 3.3 g gelatin/m$^2$ to give test sample No. 1. In a comparative test, sample No. 2 was prepared which contained the identical NC layer coated on a sample of commercially available antistatic filmbase with a polyfunctional aziridine-crosslinked (as opposed to an aziridine polymeric component) poly(sodium styrene-sulfonate-maleic anhydride) antistatic layer. The antistat performance of test sample No. 1 was compared to test sample No. 2, as well as to a series of commercially available antistatic film products. Antistat performance was evaluated by measuring charge decay times. The test methodology is described in Federal Test Method Standard 101C, Method 4046, using an Electro-Tech Systems Model 406C static decay meter. The time in seconds for an initially applied charge at 5 KV to decay to 1% of its initial value is given. Tests were performed on conditioned strips at 30%

RH. The shorter the decay time, the more effective is the antistat performance. A charge decay time of 0.5 sec or less is generally acceptable. Wet adhesion was determined by a rub test after soaking scribed films in developer and comparing the extent of degradation against fixed standards. The wider the abraded area about the scribe the poorer the adhesion, with a 1 rating being the best performance and a 5 rating adhesion failure. Antistat layers having a wet adhesion values of 3 are minimally acceptable. The results are shown in Table 2.

TABLE 2

| TEST SAMPLE | DECAY TIME$^A$ (seconds) | DECAY TIME$^B$ (seconds) | WET ADHESION |
|---|---|---|---|
| 1 | 0.02 | 0.23 | 1 |
| 2 | 0.10 | 0.21 | 5 |
| 3 | IC | IC | 1 |
| 4 | 0.11 | 0.51 | 5 |
| 5 | 0.25 | 0.96 | 1 |

$^A$Before processing
$^B$After processing
1 Invention.
2 NC gelatin coat on a commercially available antistatic filmbase.
3 Same film product as sample 1 but without antistat protection
4 Commercial antistatic film no. 1.
5 Commercial antistatic film no. 2.
IC = Initial charge was maintained without decay.

As shown by the comparative results in Table 2, test sample No. 1 containing the antistatic layer of the invention had clearly superior antistatic and/or wet adhesion performance relative to the tested commercial products.

EXAMPLE 3

Solutions #1 and #2 were prepared exactly as described in Example No. 2. Additional and comparative polyelectrolyte solutions #1a and #1b were prepared as described below.

| Comparative Solution #1a | |
|---|---|
| Ingredient | Amount |
| 25% Aqueous solution of Versa TL-501 NaPSS Homopolymer | 3.45 L |
| Water | 49 L |
| Triton X-200 | 0.42 L |

| Comparative Solution #1b | |
|---|---|
| Ingredient | Amount |
| Solution #1a and 28% aqueous ammonia | 30 cc |

In solution #1a, the acid catalyst was purposefully omitted while in solution #1b, aqueous ammonia was substituted for the acid catalyst. The coating solutions were then prepared as described in Example No. 2, with injection of the monomer solution #2 into polyelectrolyte solutions #1, #1a and #1b just prior to coating on the polyester base. The drying temperatures of the test samples again did not exceed 50° C. Thereafter, an NC gelatin layer was coated over each of these samples exactly as described in Example No. 2. The coatings were cured at 40° C. for three days, and their surface resistivities measured before and after photographic processing. These results are summarized in Table 3 below.

TABLE 3

| Test# | Polyelectrolyte Solution No. | (SR)u | (SR)p |
|---|---|---|---|
| 1 | 1 | 2.7E11 | 2.2E12 |
| 2 | 1a | 6.1E12 | >1E14 |
| 3 | 1b | 6.4E12 | >1E14 |

As shown in Table 3, the antistat layer of test sample No. 1 had superior surface resistivity before and after processing in contrast to test sample Nos. 2 and 3. These results demonstrate that acid catalysis in formation of the antistat layer is important in achieving the desirable antistatic properties of the invention.

EXAMPLE 4

Solutions of a monomer, two sulfonated styrene polymers, one with and one without functionally attached carboxylate groups, were prepared and coated in accordance with Example 2. Test samples No. $1^a$ and $3^a$ in Table 4 were coated as described in Example 2, with a 25% aqueous solution of sodium polystyrene sulfonate non-crosslinkable homopolymer (NaPSS) (Versa TL-501). In the comparative test samples $2^b$ and $4^b$, a 25% aqueous solution of a 3/1 copolymer of sodium styrene-sulfonate-maleic anhydride (Versa TL -7005) having functionally attached (crosslinkable) carboxylate groups was identically prepared and coated. The polyelectrolyte coat weight was 0.865 g/m$^2$ for all coatings. An NC gelatin formulation was coated on the antistat layers of the test samples at 3.0 g gelatin/m$^2$. All coatings were then cured at 40° C. for three days. The results reported in Table 4 correspond to those reported in Table 1. Test samples No. $3^a$ and $4^b$ contained the antistat layer of the invention.

TABLE 4

| TEST SAMPLE | POLYMER/ XAMA7 wt. ratio | (SR)u | (SR)p | ANTISTAT LAYER |
|---|---|---|---|---|
| $1^a$ | 100/9 | 1.6E13 | 9.5E12 | NO |
| $2^b$ | 100/9 | 2.9E11 | >1E14 | NO |
| $3^a$ | 100/46 | 2.1E11 | 3.1E11 | YES |
| $4^b$ | 100/46 | 3.0E11 | 7.4E11 | YES |
| 5 | — | >1E14 | >1E14 | NO |
| 6 | — | 4.8E10 | 7.2E11 | — |
| 7 | — | 8.4E11 | 2.9E12 | — |

$^a$Versa TL-501 (78-7063). Commercially available as a purified and desalted sample from National Starch.
$^b$Versa TL-7005. Commercially available as a purified and desalted sample from National Starch.
5 Gel NC only.
6 Commercial antistat film no. 1.
7 Commercial antistat film no. 2.

Figure 5:
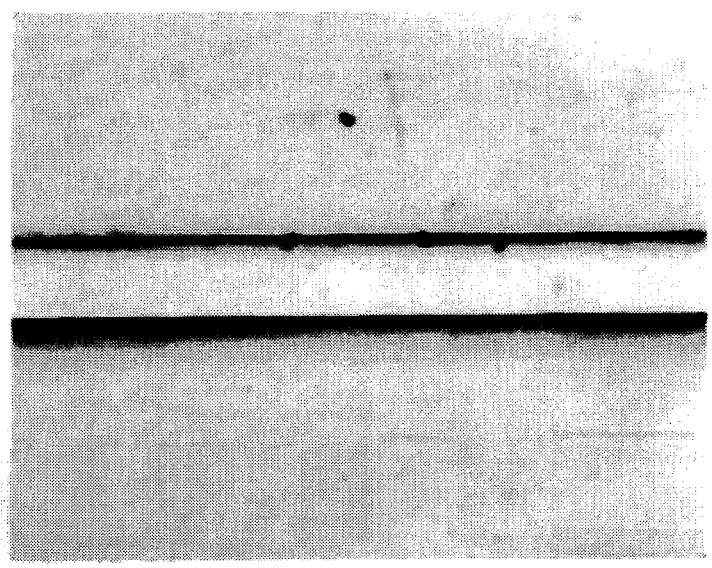
FIG. 5 is an optical micrograph (1000X magnification) of a cross-sectional view of control test sample $2^b$ (Table 4) prepared by coating a gelatin non-curl layer over a layer of sodium styrenesulfonate-maleic anhydride copolymer (Versa TL-7005, MW 35,000)/XAMA-7 at a weight ratio of 100:9 on a PET support as described in Example 4. No distinct antistatic layer is visible.
Figure 6:
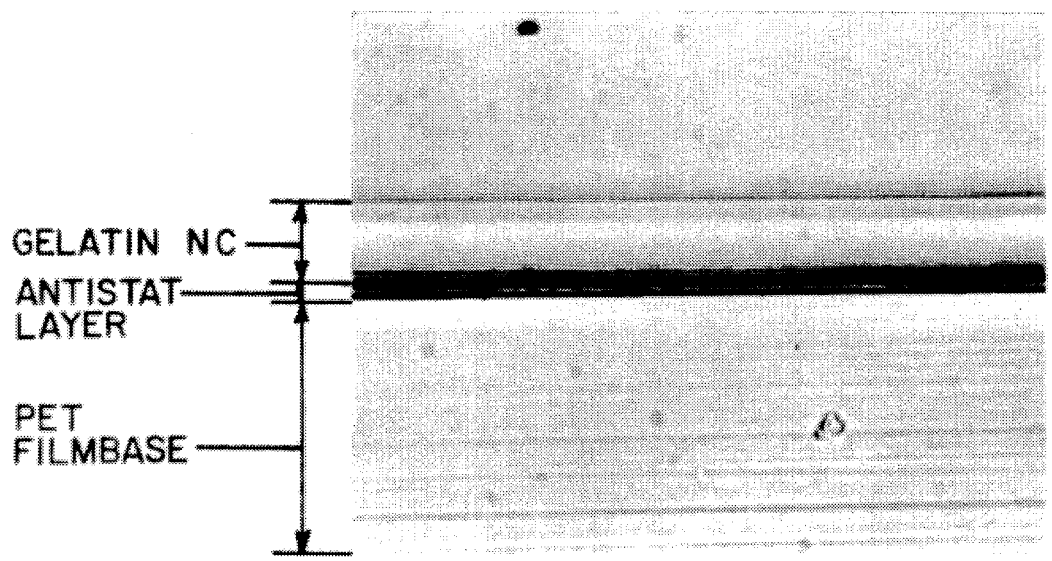
FIG. 6 is an optical micrograph (1000X magnification) of a cross-sectional view of test sample $4^b$ (Table 4) containing a gelatin non-curl overcoat layer, a distinct intermediate antistatic layer of sodium styrenesulfonate-maleic anhydride copolymer (Versa TL-7005, MW 35,000)/XAMA-7 at a weight ratio of 100:34 on a PET support as described in Example 4.

As shown in Table 4 and FIG. 5 (test sample $2^b$), low weight ratios (100:9) of XAMA-7/polyelectrolyte do not result in a permanent antistatic layer regardless of whether the polyelectrolyte had functionally attached carboxylate groups (i.e., regardless of whether the polyelectrolyte was crosslinkable or not). In contrast, Table 4 and FIG. 6 (test sample 4b), relatively high weight ratios (exceeding 100:34) of XAMA-7/polyelectrolyte provided a superior permanent (and distinct) antistatic layer.

EXAMPLE 5

Two antistatic coatings were prepared. Sample #1 was prepared exactly as described in Example 2 on a PET support. Sample #2 was identically prepared, except that an additional ingredient, Elvanol 71-30 (polyvinyl alcohol, Dupont, Wilmington, Del.), was added at 5% by weight of the Versa TL 501. Neither antistat layer was overcoated with a gelatin NC layer. Each of the samples was slit to give 300 ft by 70 mm film rolls wound about a 3" diameter core. Sample #3 (control) was a film roll having the same dimensions but prepared from a commercially available antistatic filmbase. Six lineal feet of each of the antistatic film rolls was unwrapped in a controlled humidity room which was maintained at 80% RH. After conditioning for two minutes, the rolls were rewrapped and stored. The table below indicates the time elapsed when the roll blocked, i.e., became stuck and could not be unwound without destroying the antistat coating or ripping the support.

TABLE 5

| TEST SAMPLE | RELATIVE HUMIDITY | TIME TO BLOCK |
| --- | --- | --- |
| 1 | 80% | DNB |
| 2 | 80% | DNB |
| 3 | 80% | 1 minute |

DNB- Did not block after four days.

I claim:

1. A photographic element comprising a support having at least one surface, at least one photosensitive layer on the support, and a permanent antistatic layer coated on at least one surface of the support, wherein the antistatic layer comprises a distinct layer, said antistatic layer comprising a polymer polymerized on said support from monomers, in the presence of a water-soluble, electrically conductive polyelectrolyte, wherein the monomers comprise polyfunctional aziridines, wherein said polymer entraps the polyelectrolyte, wherein said polyelectrolyte contains ionizable functional groups selected from the group consisting of salts of sulfonic acid and salts of hydrogen sulfate, and wherein the weight ratio of the monomers to the polyelectrolyte is greater than 0.3 but less than or equal to 1.0.

2. The photographic element according to claim 1, wherein the weight ratio of the polyelectrolyte to the monomers ranges between about 100:40 and about 100:100.

3. The photographic element according to claim 2, wherein the weight ratio of the polyelectrolyte to the monomers ranges between about 100:40 and about 100:50.

4. The photographic element according to claim 2, wherein the polymerization has occurred at a temperature ranging between about 10° C. and 60° C.

5. The photographic element according to claim 4, wherein the polymerization has occurred at a temperature ranging between about 30° C. and 60° C.

6. The photographic element according to claim 1, wherein the photosensitive layer is a photographic silver halide emulsion layer.

7. The photographic element according to claim 1, wherein the support is a polyester film.

8. The photographic element according to claim 1, wherein the polyelectrolyte comprises homopolymers and copolymers of sodium styrenesulfonate; homopolymers and copolymers of sodium vinylsulfonate; homopolymers and copolymers of sodium 2-acrylamido-2-methyl-1-propanesulfonate; homopolymers and copolymers of sodium polyvinylsulfate; homopolymers and copolymers of sodium 2-sulfoethyl methacrylate; homopolymers and copolymers of sodium 2-sulfopropyl methacrylate; homopolymers and copolymers of sodium 3-sulfopropyl acrylate; poly(sodium 2-methacryloyloxyethane-1-sulfonate); poly(sodium 3-methacryloyloxypropane-1-sulfonate); poly[sodium 3-(vinyloxy)propane-1-sulfonate); or poly(sodium 4-vinylphenyl sulfate).

9. The photographic element according to claim 8, wherein said homopolymers or copolymers of sodium styrenesulfonate comprise poly(sodium styrenesulfonate-co-acetoacetoxyethyl methacrylate), poly(sodium styrenesulfonate-co-maleic anhydride), or poly(sodium styrenesulfonate).

10. The photographic element according to claim 9, wherein said poly(sodium styrenesulfonate) has a number average molecular weight ranging between about 30,000 and about 1,000,000.

11. The photographic element according to claim 8, wherein said homopolymers and copolymers of sodium vinylsulfonate comprise poly(sodium vinylsulfonate) and poly(sodium vinylsulfonate-co-potassium vinylsulfinate).

12. The photographic element according to claim 8, wherein said homopolymers and copolymers of sodium 2-acrylamido-2-methyl-1-propane sulfonate comprise poly-(sodium 2-acrylamido-2-methyl-1-propanesulfonate) and poly(sodium 2-acrylamido-2-methyl-1-propanesulfonate-co-(acetoacetoxyethyl methacrylate).

13. The photographic element according to claim 1, wherein the monomer comprises pentaerythritol-tri-(β-(N-aziridinyl) propionate), trimethylol propane-tri-[β-(N-aziridinyl)propionate], or 1-aziridinepropanoic acid, 2-methyl-, 2-ethyl-2-[[3-(2-methyl-1-aziridinyl)-1-oxopropoxy]methyl]-1,3-propanediyl ester.

14. The photographic element according to claim 13, wherein the monomer comprises pentaerythritol-tri-(β-(N-aziridinyl) propionate).

15. A photographic element comprising a support having at least one surface, at least one photosensitive layer on the support, and a permanent antistatic layer coated on at least one surface of the support, wherein the antistatic layer comprises a distinct layer on said support, said antistatic layer comprising a polymer polymerized on said support from monomers in the presence of:
  (a) a water-soluble, electrically conductive polyelectrolyte having as its only ionizable functional groups at least one member selected from the group consisting of salts of sulfonic acid, salts of hydrogen sulfate and combinations thereof; and
  (b) wherein said monomers comprise polyfunctional aziridine monomers.

16. The photographic element according to claim 15, wherein the weight ratio of the polyelectrolyte to the monomers ranges between about 100:20 and about 100:100.

17. The photographic element according to claim 16, wherein the weight ratio of the polyelectrolyte to the monomers ranges between about 100:40 and about 100:50.

18. The photographic element according to claim 15, wherein the polymerization has occurred at a temperature ranging between about 10° C. and 60° C.

19. The photographic element according to claim 18, wherein the polymerization has occurred at a temperature ranging between about 30° C. and 60° C.

20. The photographic element according to claim 15, wherein the photosensitive layer is a photographic silver halide emulsion layer.

21. The photographic element according to claim 15, wherein the support is a polyester film.

22. The photographic element according to claim 15, wherein the polyelectrolyte comprises homopolymers and copolymers of sodium styrenesulfonate; homopolymers and copolymers of sodium vinylsulfonate; homopolymers and copolymers of sodium 2-acrylamido-2-methyl-1-propanesulfonate; homopolymers and copolymers of sodium polyvinylsulfate; homopolymers and copolymers of sodium 2-sulfoethyl methacrylate; homopolymers and copolymers of sodium 3-sulfopropyl methacrylate; homopolymers and copolymers of sodium 3-sulfopropyl acrylate; poly(sodium 2-methacryloyloxyethane-1-sulfonate); poly(sodium 3-methacryloyloxypropane-1-sulfonate); poly[sodium 3-(vinyloxy)propane-1-sulfonate]; or poly(sodium 4-vinylphenyl sulfate).

23. The photographic element according to claim 22, wherein said homopolymers or copolymers of sodium styrenesulfonate comprise poly(sodium styrenesulfonate-co-acetoacetoxyethyl methacrylate) or poly(sodium styrenesulfonate).

24. The photographic element according to claim 23, wherein said poly(sodium styrenesulfonate) has a number average molecular weight ranging between about 30,000 and about 1,000,000.

25. The photographic element according to claim 22, wherein said homopolymers and copolymers of sodium vinylsulfonate comprise poly(sodium vinylsulfonate) and poly(sodium vinylsulfonate-co-potassium vinylsulfinate).

26. The photographic element according to claim 22, wherein said homopolymers and copolymers of sodium 2-acrylamido-2-methyl-1-propane sulfonate comprise poly-(sodium 2-acrylamido-2-methyl-1-propanesulfonate) and poly(sodium 2-acrylamido-2-methyl-1-propanesulfonate-co-(acetoacetoxyethyl methacrylate).

27. The photographic element according to claim 15, wherein the monomer comprises pentaerythritol-tri-($\beta$-(N-aziridinyl) propionate), trimethylol propane-tri-[$\beta$-(N-aziridinyl) propionate], or 1-aziridinepropanoic acid, 2-methyl-, 2-ethyl-2-[[3-(2-methyl-1-aziridinyl) -1-oxopropoxy]methyl]-1,3-propanediyl ester.

28. The photographic element according to claim 27, wherein (b) comprises pentaerythritol-tri-($\beta$-(N-aziridinyl)propionate).

* * * * *